United States Patent [19]
Vloedman

[11] Patent Number: 5,454,419
[45] Date of Patent: Oct. 3, 1995

[54] METHOD FOR LINING A CASING

[75] Inventor: Jack Vloedman, Oklahoma City, Okla.

[73] Assignee: Polybore, Inc., Oklahoma City, Okla.

[21] Appl. No.: 308,784

[22] Filed: Sep. 19, 1994

[51] Int. Cl.[6] .................................................. E21B 33/00
[52] U.S. Cl. .......................................... 166/277; 166/77.2
[58] Field of Search .................................... 166/277, 75.1, 166/77, 78, 118, 119, 242

[56] References Cited

U.S. PATENT DOCUMENTS

| | | | |
|---|---|---|---|
| 4,441,561 | 4/1984 | Garmong | 166/77 X |
| 4,673,035 | 6/1987 | Gipson . | |
| 4,971,152 | 11/1990 | Koster et al. | 166/277 |
| 5,348,096 | 9/1994 | Williams . | |

OTHER PUBLICATIONS

Article from "World Oil's Coiled Tubing Handbook", 1993; Part 1—The evolution of coiled tubing equipment.
Article from "World Oil's Coiled Tubing Handbook", 1991; Part 2—Workover safety.
Article from "World Oil's Coiled Tubing Handbook", 1993; Part 3—Tube Technology and capabilities.
Article from "World Oil's Coiled Tubing Handbook", 1993; Part 9—Fishing.

*Primary Examiner*—Michael Powell Buiz
*Attorney, Agent, or Firm*—Dunlap & Codding

[57] ABSTRACT

A method of lining a casing affixed in a well bore for repairing breaches in the casing with a continuous string of tubular polymeric material is provided. The tubular polymeric material has an outer diameter greater than the inner diameter of the casing. The outer diameter of the tubular polymeric material is reduced and such reduced material is injected into casing such that the polyethylene pipe remains in a reduced state until the polyethylene pipe is run to a preselected depth. After the polyethylene pipe is run to the desired depth, the reduced pipe is allowed to rebound thereby forming a fluid tight seal with the casing and effectively sealing any breaches in the casing.

29 Claims, 6 Drawing Sheets

METHOD FOR LINING A CASING

BACKGROUND OF THE INVENTION

1. Field of the Invention

The present invention relates to a method for sealing areas in a well bore, and more particularly, by not by way of limitation, to an improved method for inserting a tubular polymeric liner into a casing affixed within a well bore for repairing breaches in the casing.

2. Description of Related Art

As the drilling of an oil or gas well progresses, the well bore is lined with a casing which is secured in place by a cement slurry injected between the exterior of the casing and the well bore. The casing functions to provide a permanent well bore of known diameter through which drilling, production or injection operations may be conducted. The casing also provides the structure for attaching surface equipment required to control and produce fluids from the well bore or for injecting fluids therein. In addition, the casing prevents the migration of fluids between subterranean formations through the well bore, i.e., the intrusion of water into oil or gas formations or the pollution of fresh water by oil, gas or salt water.

The mechanical integrity of the casing and the ability of the casing to isolate subterranean formations is closely regulated. Casing which has been cemented in a well bore is required to pass a mechanical integrity test to assure that no breaches in the the casing must be repaired. Mechanical integrity failure can result from various means, such as corrosion, old perforations, or other breaches in the casing including joint leaks, split casing or parted casing.

Mechanical integrity failures are normally repaired by either replacing the defective casing, cementing a new casing inside the old casing, or injecting cement into the breach of the casing which is commonly known as "squeeze cementing". Replacement of defective casing is often not feasible because of the initial completion method used and the risk in damaging additional casing because of stress imparted on the casing during such an operation. Because the operation of inserting a new casing inside the old casing is expensive, this option may not be economically feasible. Additionally, squeeze cementing is not always economically feasible, and is inappropriate for certain types of subterranean formations. Furthermore, when squeeze cementing is utilized, satisfactory results are not always obtained. Finally, each of these remedies are costly in terms of the amount of time required for each operation, and therefore, the amount of time that the well is out of service.

To avoid the expense and time associated with the above-mentioned remedies, sealing apparatus employing retrievable packers have been utilized for sealing and isolating casing at the point of the mechanical integrity failure. However, when employing such sealing apparatus, problems have been encountered. For example, the annular flow of fluids about a tubing string which extends through the sealing apparatus is often restricted, thus producing a hydraulic breaking effect as the apparatus is inserted into the well bore. Further, the annular flow may be restricted during mechanical integrity testing which requires an annulus between the tubing string and the casing. Lastly, the sealing apparatus is often ineffective because the resilient sealing elements become worn or deteriorate due to rough or cement-coated interior casing walls when the sealing apparatus is inserted into the well bore.

To this end, increased attention has been given to finding an improved method for lining a casing to repair breaches therein which is durable and effective, while remaining inexpensive and time efficient. It is to such an improved method that the present invention is directed.

DETAILED DESCRIPTION

Figure 1:
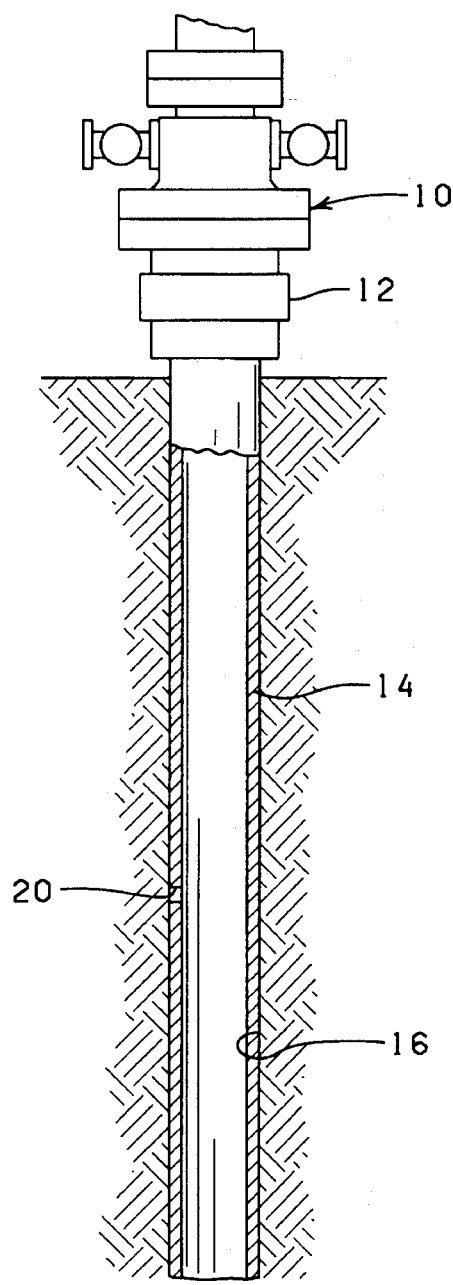
FIG. 1 is a cross sectional view of a well bore having a casing affixed therein showing the casing having a breach.

Referring now to the drawings, and more specifically to FIG. 1, a typical wellhead configuration 10 utilized in the production of oil and gas from a well is shown. The wellhead configuration 10 includes a casing head 12 which functions to support a casing 14 which is extended down the well to provide a permanent borehole through which production operations may be conducted. The casing 14 is shown affixed in a well bore 16 in a conventional manner, such as by cement (not shown). The casing 14 is illustrated as having a breach 20.

As mentioned above, the casing which lines an oil or gas well is intended to isolate subterranean formations to prevent the migration of fluids between various formations through the well bore. A breach in the casing provides a conduit between different formations and allows for the migration of fluids therebetween. The ability of fluids to migrate may result in fresh water formations being contaminated with hydrocarbons and salt water, hydrocarbons or injection fluids being lost to surrounding formations, or water flowing into the producing zone which substantially increases pumping and separating costs.

Current methods of repairing leaks in casing are expensive and typically ineffective. As such, often the only option available to a well operator is to plug the leaking well thereby rendering it unusable for future production, injection, or disposal. Therefore, an effective and inexpensive method of repairing leaking casing is needed. Otherwise, leaking wells, unable to pass a mechanical integrity test, will continue to be plugged prematurely resulting in a shortage of production, injection and disposal wells.

Figure 2:
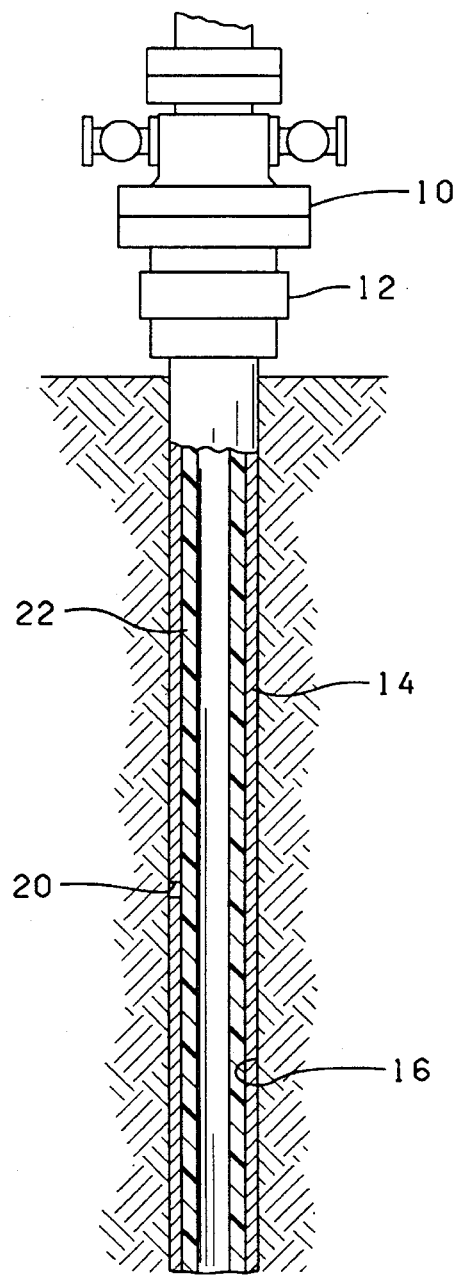
FIG. 2 is a cross sectional view of the well bore of FIG. 1 showing a casing liner of the present invention inserted into the casing.

FIG. 2 shows a casing liner 22 inserted in the casing 14 in accordance with the present invention wherein the breaches 20 in the casing 14 are effectively sealed. The casing liner 22 is fabricated of a tubular polymeric material which is compressible and has sufficient memory so as to permit the material to return to its original shape after the compression forces are removed from the material. More specifically, the tubular polymeric material is compressible in such a manner that the outer diameter of the tubular polymeric material can be substantially reduced in size and the memory of the material allows the material to be rebound to its original size after a period of time. This capability of the diameter of the casing liner 22 to be downsized enables a tubular polymeric material having an outer diameter greater than the inner diameter of the casing 14 to be injected into the casing 14. With the reduced tubular polymeric material positioned within the casing 14, the memory of the polymeric material causes the casing liner to expand within the casing 14 and press against the casing wall. Because the original outer diameter of the tubular polymeric material is greater than the inner diameter of the casing 14, the expanding tubular polymeric material presses tightly against the casing 14 and forms a fluid tight seal over the breaches 20. To this end, the casing liner 22 is sealingly secured against the casing 14 without the use of adhesives which have generally proven to be ineffective in downhole environments.

A preferable material for the fabrication of the casing liner 22 is high density polyethylene pipe. In addition to the compression and memory characteristics mentioned above, polyethylene pipe is resistant to abrasion, which enables it to withstand the passage of downhole tools, and resistant to chemical and salt water corrosion. Furthermore, polyethylene pipe can be formed into a long, continuous joint containing no joint connections. This is important in that many casing leaks occur in or near the connection of one joint of casing to the adjacent joint of casing. By lining the casing 14 with a continuous joint of material, all casing joints are effectively sealed.

While polyethylene pipe is described herein as the material of preference for the fabrication of the casing liner 22 of the present invention, it will be recognized that the casing liner 22 is not limited to being fabricated of polyethylene. The casing liner 22 can be fabricated of any durable viscoelastic material capable of withstanding temperatures and pressures typically encountered in oil and gas wells and which has compression and memory properties that allow it to be downsized for insertion into the casing and subsequently permit it to expand to form a fluid tight seal against the casing 14.

Figure 3:
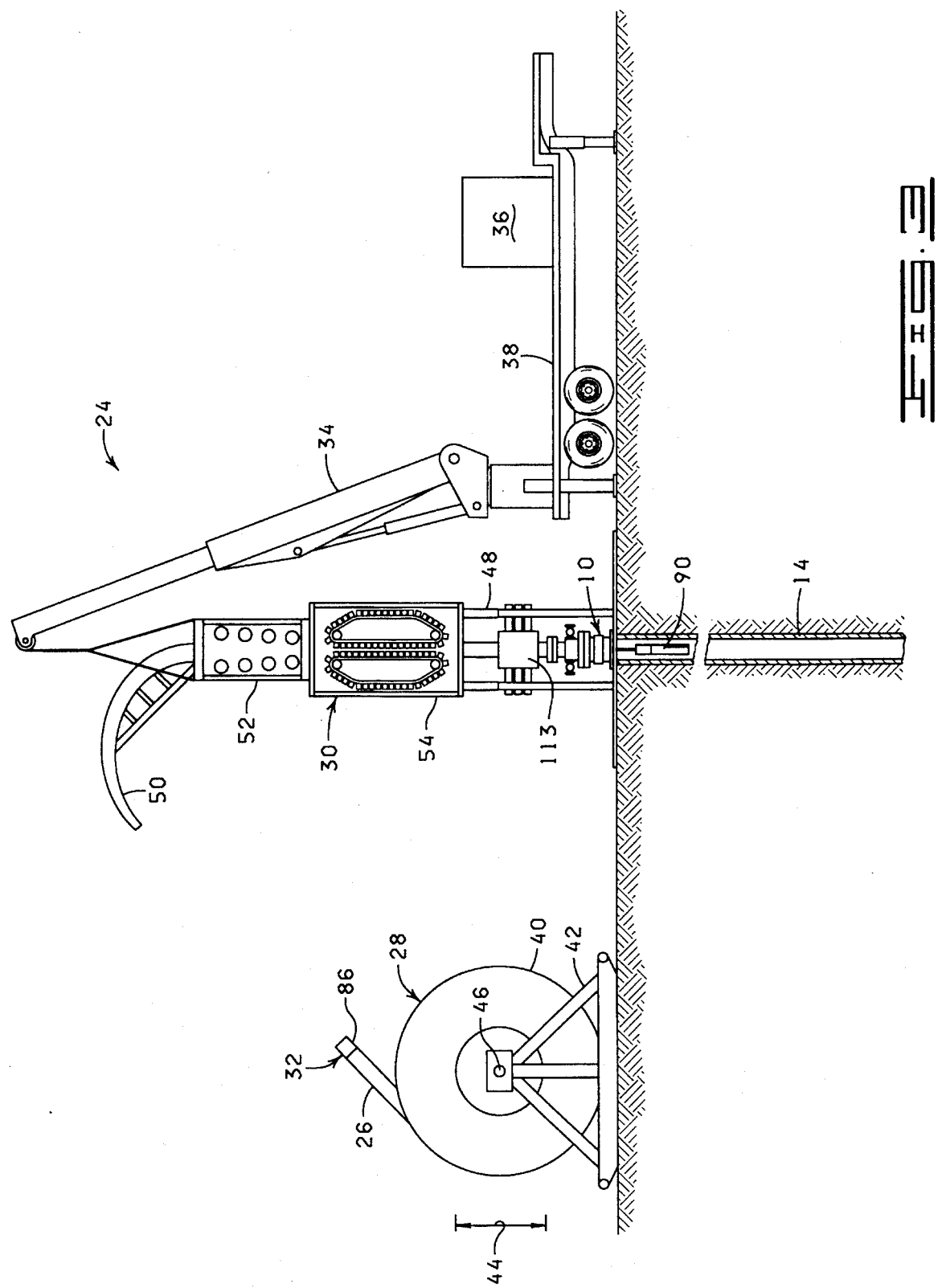
FIG. 3 is a diagrammatical illustration of a casing liner injection unit used in the method of the present invention.

Referring now to FIG. 3, a casing liner injector unit 24 constructed in accordance with the present invention for injecting a tubular polymeric material, such as a coiled polyethylene pipe 26, into the casing 14 in order to form the casing liner 22 (FIG. 2) is schematically illustrated.

The casing liner injector unit 24 includes a reel 28 for handling and storing the polyethylene pipe 26, a roller reduction injector unit 30, a bottom hole assembly 32, a crane 34, and a hydraulic power-drive unit 36. The crane 28 and the hydraulic power-drive unit 36 are shown as being mounted on a flat bed trailer 38 which is adapted to be connected to a vehicle, such as a truck (not shown), to allow for equipment mobility. This is for illustrative purposes only, and it will be understood by those skilled in the art that the logistical configuration of the various components of the casing liner injector unit 24 is not critical to the basic function and operation of the present invention.

The reel 28 comprises a spool 40 rotatably mounted to a frame 42. The frame 42 is set on a suitable support surface such as the ground (FIG. 3), a trailer, or offshore platform deck. The spool 40 has a core diameter 42 suitable for storing a polyethylene pipe of sufficient outer diameter to form a compression fit against the casing. For example, a casing having an outer diameter of 5.5 inches will have an inner diameter of about 4.95 inches. As such, a polyethylene pipe having an outer diameter greater than 4.95 inches is required for the present invention, such as 5.25 inches, for example.

The inboard pipe end can be connected through the hollow end of the spool 40 to a high pressure rotating joint (not shown) mounted directly to the shaft 46 of the spool 42. This rotating joint is secured to a stationary piping section (not shown), which is then connected to a fluid or gas pumping system (not shown). As a result, continuous pumping and circulation through the polyethylene pipe 26 on the reel 28 can be maintained throughout the lining injection process. The significance of this will be explained below.

The roller reduction injector unit 30 is supported above the well head 10 by a support structure 48. The crane 34 is connected to the roller reduction injector unit 30 to facilitate the rigging up and the rigging down process by enabling the roller reduction injector unit 30 to be moved from the trailer 38 to its position over the wellhead 10 and back to the trailer 38 once the injection process is completed. It will be recognized that the crane 34 also cooperates with the support structure 48 to support the roller reduction injector unit 30 above the wellhead 10.

The roller reduction injector unit 30 serves to direct the polyethylene pipe 26 into the casing 14, to reduce the polyethylene pipe 26 to the desired diameter, and to inject the reduced diameter pipe 26 into the casing 14. To this end, the roller reduction injector unit 30 includes a tubing guide or goose neck 50, a roller reduction unit 52 and an injector head 54. The tubing guide 50, the roller reduction unit 52, and the injector head 54 are assembled in a stacked configuration wherein the tubing guide 50 receives the polyethylene pipe 26 from the reel 28 and directs the polyethylene pipe 26 into the roller reduction unit 52 which is positioned on top of the injector head 54.

Receiving the polyethylene pipe 26 from the tubing guide 50, the roller reduction unit 52 gradually reduces the outer diameter of the polyethylene pipe 26 as it passes therethrough and advances the pipe 26 into the injector head 54. The injector head 54 is adapted to frictionally engage the reduced polyethylene pipe 26 to provide the thrust to snub the reduced polyethylene pipe 26 into the casing 14 and to control the rate of entry into the casing 14 in combination with the roller reduction unit 52.

Figure 4:
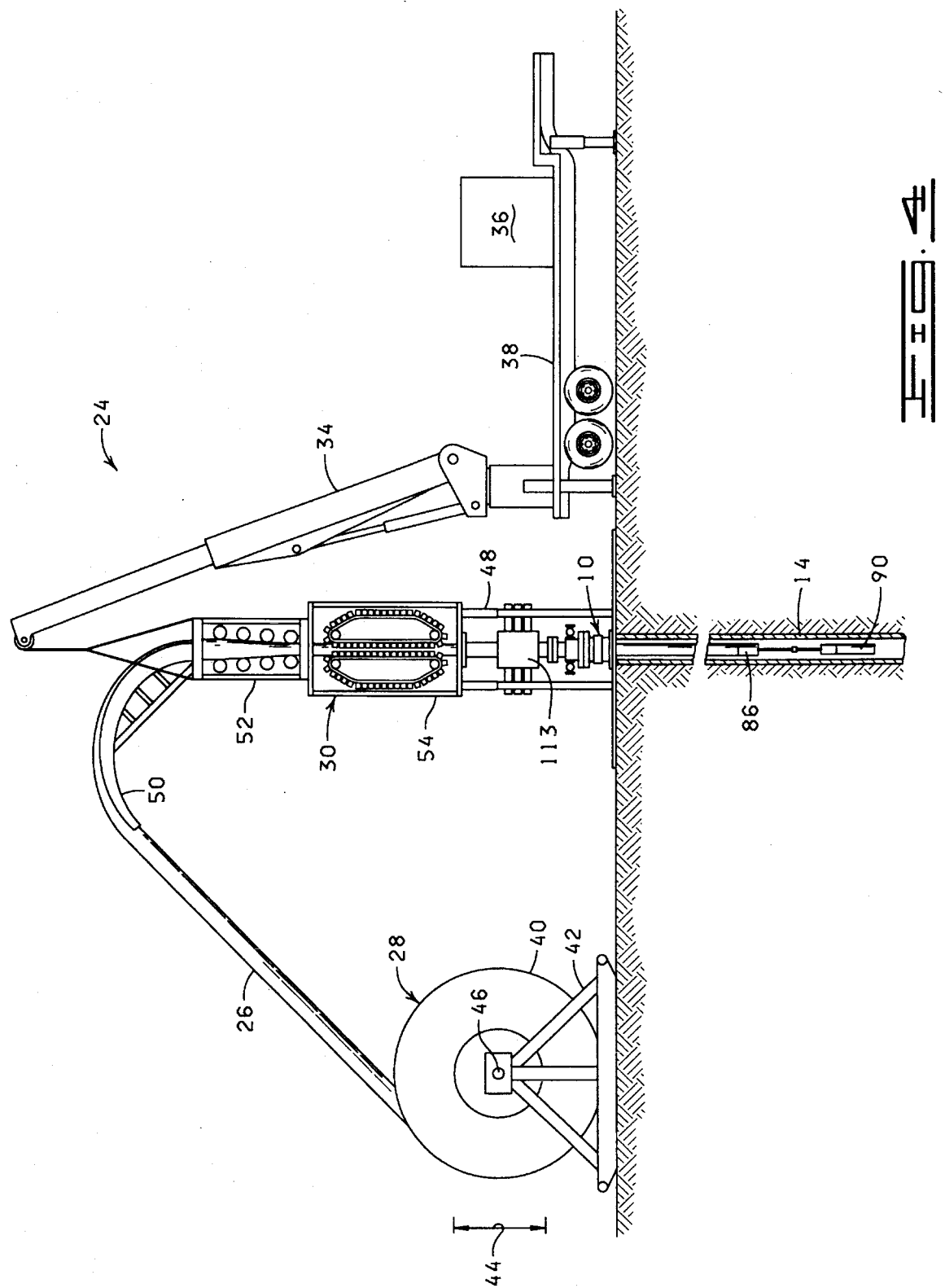
FIG. 4 is a diagrammatical illustration of the casing liner injection unit showing a tubular polymeric material being injected into the casing.

As best shown in FIG. 4, the roller reduction unit 52 includes a support frame 56 having a first end 58 and a second end 60. The support frame 56 supports several banks of rollers 62, 64, 66, and 68, which are each journaled to the frame 56. The rollers in each bank 62–68 are arranged to form a substantially circular passageway 70 through which the pipe can be passed. Each subsequent bank of rollers 62–68 from the first end 58 to the second end 60 provide a passageway having a smaller diameter than the previous bank of rollers thereby cooperating to form a substantially frusto-conically shaped passageway such that the outer diameter of the polyethylene pipe 26 will be gradually reduced as the polyethylene pipe 26 is passed therethrough. The banks of rollers 62–68 are preferably set up to reduce the outer diameter of the tubular polymeric material approximately 15%.

Figure 5:
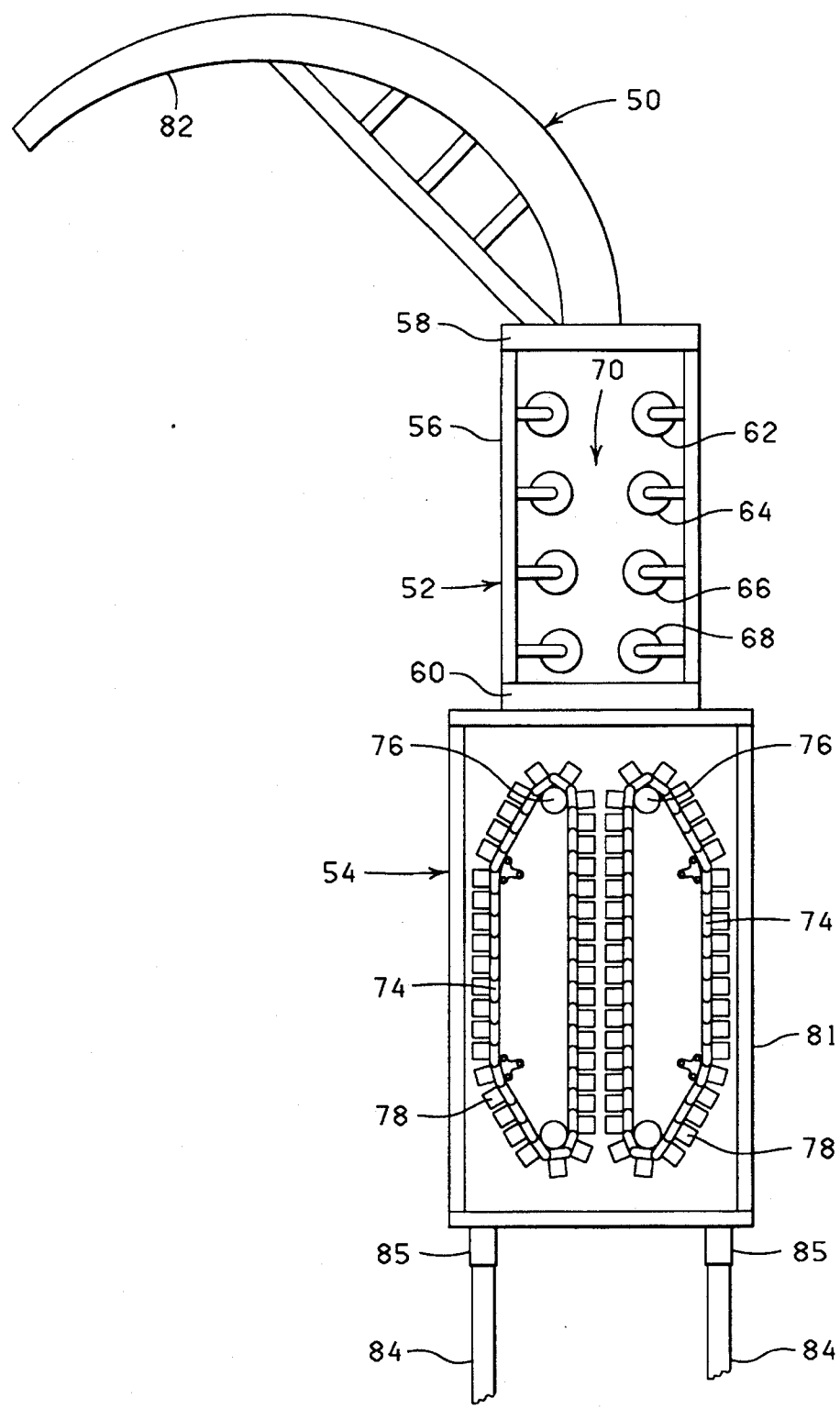
FIG. 5 is a schematic illustration of a roller reduction injector unit used in the method of the present invention.

To reduce trauma on the pipe 26 during pipe reduction so as to lengthen the time period the pipe 26 will remain in a reduced state, each subsequent bank of rollers 62–68 is provided with a greater number of rollers than the previous bank of rollers thereby more evenly distributing the radial compressive forces applied to the pipe and uniformly reducing the diameter of the pipe 26 by preventing the formation of longitudinal ridges in the pipe 26. For example, when lining a 5.5 inch casing it is preferable that the roller reduction unit be provided with at least four banks of rollers (as illustrated in FIGS. 3–5) with the banks having five, six, seven, and eight rollers per bank, respectively. For larger polyethylene pipe a greater number of banks is preferable. By uniformly reducing the pipe 26 and thus reducing the amount of trauma experienced by the pipe 26, longer reduction times are provided.

Each bank of rollers 62–68 is controlled by a hydraulic motor (not shown) powered by the hydraulic power-drive unit 36. The hydraulic motors are used in cooperation with the injector head 54 to control the insertion rate of the polyethylene pipe 26 into the casing 14 with respect to injection, as well as braking of the pipe.

The liner injector head 54 is similar to a tubing head injector used to inject coiled tubing in that the injector head 54 includes two opposed sprocket-drive chains 74, which are powered by contra-rotating hydraulic motors 76. The chains 74 are fabricated with interlocking saddle blocks 78 mounted between the chain links and machined to fit the circumference of the reduced polyethylene pipe 26. The saddle blocks 78 can be coated with a gritty material, such as tungsten, to enhance the grip of the saddle block 78 to the relatively slick polyethylene pipe 26. A protective frame 81 is provided about the injector head 54.

Roller reduction units and injector heads as briefly described above are well known in the art. Thus, no further description of their components, construction, or operation is believed necessary in order for one skilled in the art to understand and implement the method of the present invention.

The roller reduction unit 52 and the injector head 54 are aligned and secured together with the roller reduction unit 52 positioned above the injector head 54 in a suitable manner, such as by bolting or welding. To guide the polyethylene pipe 26 from the reel 28 into the roller reduction unit 52, the tubing guide 50 is mounted to the first end 58 of the support frame 56 of the roller reduction unit 52. The tubing guide 50 is a series of rollers (not shown) mounted onto an arched frame 82 having a bend of about 90 degrees. The bend radius of the frame 82 is approximately the same as the core radius of the pipe reel 28.

The roller reduction injector unit 30 is supported an elevated position above the wellhead 10 with support structure 48 which can include a plurality of telescoping legs 84 (as illustrated in FIGS. 3 and 4) or other suitable device such a hydraulic jack stand. The top of the legs 84 are inserted into one of four perimeter slots 85 located on the frame 81 of the injector head 54 and secured with pins (not shown) at the desired height. It should be noted that the roller reduction injector unit 30 should be elevated sufficiently above the wellhead 10 to permit access to the wellhead 10 during the casing liner injection process. As mentioned above, the roller reduction injector unit 30 is further supported by the crane 34 which is connected to the first end 58 of the frame 56 of the roller reduction unit 52.

The hydraulic power-drive unit 36 is of conventional design in that it is equipped with diesel engines (not shown) and hydraulic pumps (also not shown). The hydraulic power-drive unit 36 is sized to operate all the casing liner injector unit components.

While the method of the present invention has been described as utilizing a roller reduction unit/injector head combination to reduce and inject the polyethylene pipe 26 into the casing 14, it will be appreciated that any suitable apparatus or combination of apparatuses can be used. For example, a modified roller reduction unit can be used which functions to reduce the outer diameter of the polyethylene pipe 26, as well as provide the force to inject the pipe into the casing 14. To this end, the roller reduction unit is provided with an additional bank of powered rollers which are positioned after the smallest set of rollers and are set up to provide a passageway which is the same size as the smallest set of rollers. With the rollers of the two final banks coated with a gritty material, such as tungston, the final two banks of rollers function similar to an injector head and provide the force to snub the polyethylene pipe into the casing.

As another alternative to the roller reduction unit/injector head combination described above, a roller reduction/wheel injector combination can be utilized to reduce and inject the polyethylene pipe 26 into the casing 14. Wheel injectors for injecting coiled tubing into a well bore, such as that described in U.S. Pat. No. 4,673,035, issued to Thomas C. Gipson on Jun. 16, 1987, the disclosure of which is hereby incorporated by reference, are well known in the art. When employing a wheel injector, the roller reduction unit 52 is disposed between the reel 28 and the wheel injector which is adapted to receive the reduced polyethylene pipe 26 from the roller reduction unit 52. Like the injector head 54, the wheel injector provides the thrust to snub the reduced polyethylene pipe into the casing.

Regardless of the manner in which the polyethylene pipe 26 is injected into the casing, it is critical that the polyethylene pipe 26 remain in a reduced state as the polyethylene pipe 26 is being injected into the casing 14 and until the polyethylene pipe 26 is set at the desired depth. The bottom hole assembly 32 functions to maintain the polyethylene pipe 26 in tension as the polyethylene pipe 26 is being injected into the casing 14 in order to sustain the reduced polyethylene pipe 26 in such reduced state. The bottom hole assembly 32 includes a pulling head 86, a weight retainer member 88 (shown in FIG. 6), and an assembly of weights 90.

Figure 6:
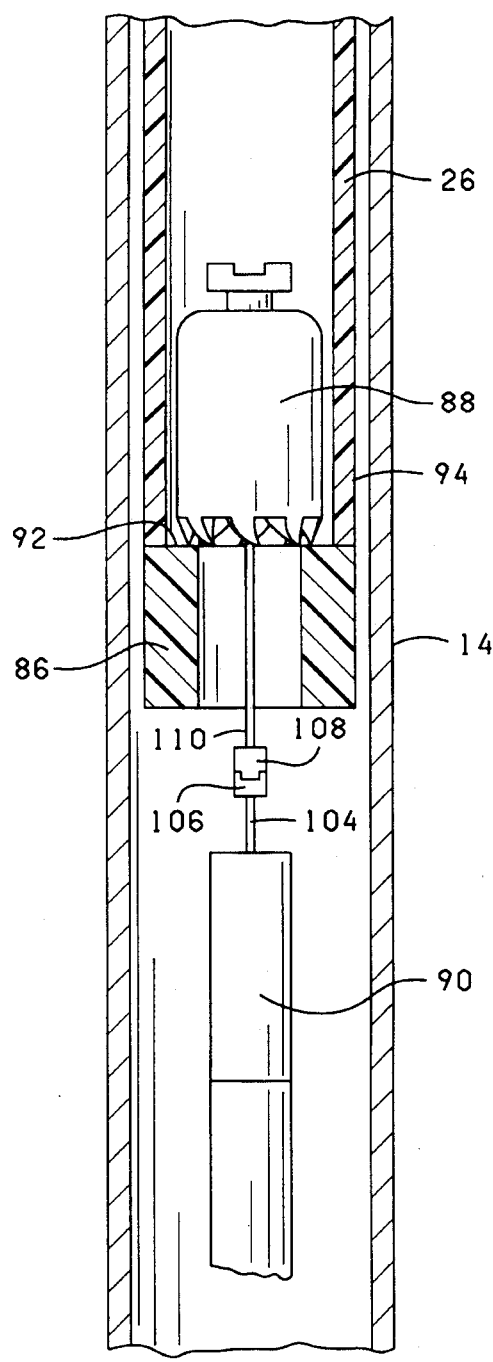
FIG. 6 is a partial cross section, elevational view of a bottom hole assembly used in the method of the present invention

Referring to FIG. 6, the pulling head 86 is a tubular piece of polymeric material, preferably fabricated of the same material from which the casing liner 22 is fabricated, having an outer diameter equal to the outer diameter of the polyethylene pipe 26 prior to reduction of the casing liner 22, but having a wall thickness greater than the wall thickness of the polyethylene pipe 26. Thus, the pulling head 86 provides an internal support shoulder 92 when the pulling head 86 is connected to the insertion end 94 of the polyethylene pipe 26. The pulling head 86 is connected to the insertion end 94 of the pipe 26 by fusing or heat welding.

The pulling head 86 is fused to the insertion end 94 of the pipe 26 prior to the polyethylene pipe 26 being passed through the roller reduction unit 52 and the injector head 54 so that the pulling head 86 is reduced in size together with the polyethylene pipe 26. However, prior to fusing the pulling head 86 to the insertion end 94 of the pipe 26, the weight retainer member 88 is disposed in the insertion end 94 of the pipe 26.

Figure 7:
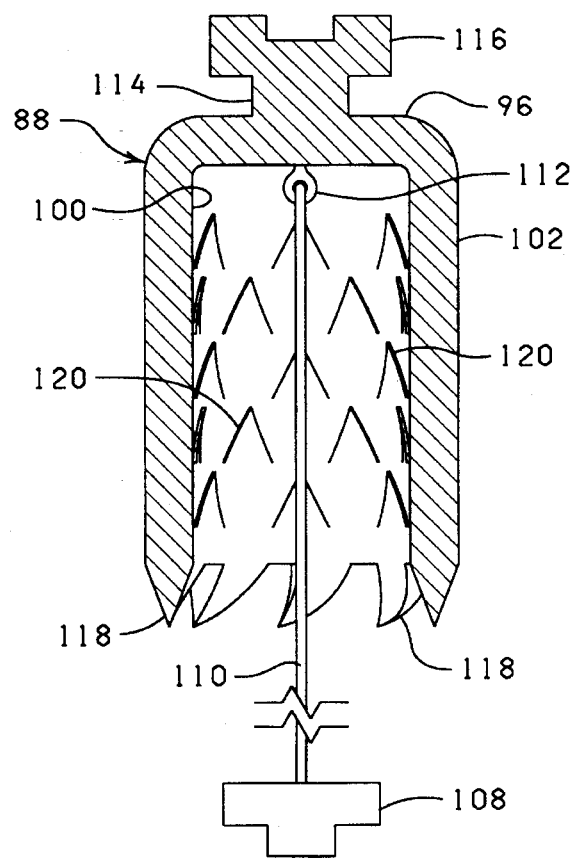
FIG. 7 is a cross sectional view of a weight retainer member of the bottom hole assembly of FIG. 6.
Figure 8:
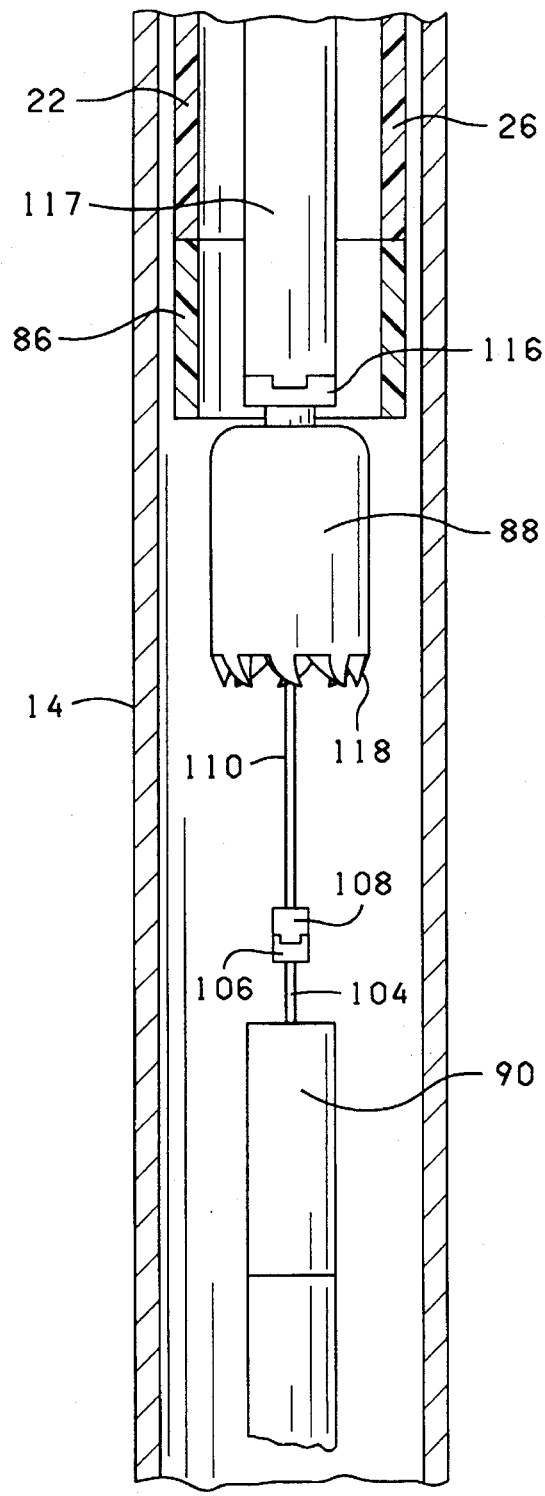
FIG. 8 is a partial cross section, elevational view showing the bottom hole assembly of FIG. 6 with the internal support shoulder of the pulling head drilled out.

As best shown in FIG. 7, the weight retainer member 88 is an open ended, cylindrical member having an upper end 96, a lower rim portion 98, an internal side 100, and an external side 102. The weight retainer member 88 is dimensioned so that the lower rim portion 98 will rest on the support shoulder 92 of the pulling head 86 when the pulling head 86 and the polyethylene pipe 26 are in their reduced state (FIG. 6). The weight retainer member 88 is constructed of a strong, durable material, such as steel, able to support the assembly of weights 90.

The assembly of weights 90 can be a series of drill collars having sufficient weight for maintaining enough tension on the polyethylene pipe 26 to keep the pipe 26 in a reduced state. The upper most drill collar is provided with a cable 104 having a connector member 106 which is detachably connected to a connector member 108 at the end of a cable 110 connected from the internal side 100 of the weight retainer member 88 via a swivel connector 112. When the assembly of weights 90 are connected to the weight retainer member 88, the weight of the drill collars is supported on the support shoulder 92 of the pulling head 86 thereby placing the polyethylene pipe 26 in tension.

Before the polyethylene pipe 26 is inserted into the casing 14 to provide the casing 14, the casing 14 is cleaned with a brush or scrapper to remove debris such as cement. The well is then killed by injecting KCl or inserting a bridge plug downhole. The assembly of weights 90 are then disposed in the upper portion of the well bore 16 and suspended therein with a pair of slips (not shown). The assembly of weights 90 can be sususpended from any convenient location such as the well head 10 or from the top of a blow out preventer stack 113 (FIGS. 3 and 4), if utilized. The weight retainer member 88 is then disposed in the insertion end 94 of the polyethylene pipe 26 and the pulling head 86 is fused thereto. Next, the pulling head 86 and the polyethylene pipe 26 are fed over the tubing guide 50 and into the roller reduction injector unit 30. With the pulling head 86 having passed through the roller reduction injector unit 30 and positioned near to the slips, the assembly of weights 90 are connected to the weight retainer member 88. To cause the weight retainer member 88 to engage against the internal support shoulder 92 of the pulling head 86 and place the reduced polyethylene pipe 26 in tension, the roller reduction injector unit 30 is reversed so as to lift the assembly or weights 90 and the slips are then removed.

With the bottom hole assembly 32 fashioned to the end of the polyethylene pipe 26, the injector head 54 and the roller reduction unit 52 are operated to inject the polyethylene pipe 26 into the casing 14, as illustrated in FIG. 4. After the weights 90 and the polyethylene pipe 26 are run a distance into the casing, the roller reduction unit 52 and the injector head 54 are operated as a braking system to control the rate of descent of the weights 90 and the polyethylene pipe 26 due to the weight of the combination of the weights 90 and the polyethylene pipe 26.

Once the polyethylene pipe 26 is run to the desired depth in the casing 14, the polyethylene pipe 26 is cut and fused to a flange which is in turn attached to the well head 10.

Next, the weight retainer member 88 and the assembly of weights 90 are removed so as to release the tension on the polyethylene pipe 26 and allow the polyethylene pipe 26 to expand into position against the casing 14. To accomplish this in such a manner that enables the weight retainer member 88 and the assembly of weights 90 to be retrieved from the well bore 16, the upper end 96 of the weight retainer member 88 is provided with a fishing neck 114 having a disconnect 116 which permits a fishing line or tubing string 117 to be inserted into the polyethylene pipe 26 and connected to the disconnect 116 of the fishing neck 114.

At this juncture with the fishing string 117 connected to the weight retainer member 88, the weight retainer member 88 and the assembly of weights 90 can be removed from the well bore 16 if the diameter of the drill collars permits passage of the drill collars through the pulling head 86. In this case, the support shoulder 92 of the pulling head 86 is subsequently drilled out to provide the casing liner 22 with a uniform inner diameter.

In a preferable manner, however, the weight retainer member 88 is formed with a plurality of cutting members 118 along the lower rim portion 98 thereof. The cutting members 118 are adapted to drill out the support shoulder 92 of the pulling head 86 when a rotational motion is imparted to the fishing string 117. After the support shoulder 92 is drilled out, the weight retainer member 88 and the assembly of weights 90 are pulled from the casing 14.

To retain the cuttings produced by the cutting members 118 and thus prevent contamination of the well bore 16, the weight retainer member 88 is further provided with a plurality of spikes 120 formed above the cutting members 118 along the interior side 100 thereof. The spikes 120 hold the cuttings until they can be properly disposed of at the surface.

As an alternative to holding the polyethylene pipe 26 in a reduced state by maintaining the polyethylene pipe 26 in tension, polyethylene can be held in a reduced state by exposing the polyethylene pipe 26 to low temperature, such as 30° F. This can be achieved by circulating cold liquid, such as nitrogen, carbon dioxide or water, through the coiled polyethylene pipe while the pipe is on the reel 28 in the manner described above. Another option is to provide an insulated box (not shown) around the reel 28 and sufficiently air condition or refrigerate the interior of the box such that the polyethylene is sufficiently cooled. The advantage of restraining the polyethylene's memory with cold temperature is that the steps of fishing the weight retainer member and the weights, and drilling the support shoulder of the pulling head, are eliminated. However, well bores typically experience high temperatures, and thus an operator has a limited amount of time (approximately 30–60 minutes) before the casing liner begins to rebound and press against the casing wall. Therefore, temperature suspension would only be used when well conditions demand it, such as with a shallow well that prohibits the suspension of the assembly of weights.

It will be recognized by those skilled in the art that the casing liner injector unit 30 of the present invention is similar in construction to a coiled tubing unit used for running a continuous string of small diameter tubing into a well bore to perform specific well servicing operations, such as cementing, fishing, stimulation, sand control, and drilling. It will further be recognized that the casing liner injector unit 30 incorporates roller reduction technology used for lining horizontal pipelines.

The reduction of polyethylene pipe for the purpose of running such reduced pipe through a horizontal pipeline has been known for several years and has met with success where the polyethylene is reduced and then pulled through the pipeline with a wireline. The wireline maintains the polyethylene pipe in tension, thereby not allowing the memory of the polyethylene to function to expand the pipe until after the tension is released. This method, however, has its limitations with respect to running polyethylene pipe down a well bore in that a wireline can not be utilized to pull the pipe into the well bore. To this end, a need has existed for an improved method for lining a casing affixed within a well bore to repair breaches in the casing. The casing liner injector unit 30 is adapted to reduce a continuous string of polyethylene pipe and run such reduced pipe into a casing lined well bore in such a manner that the polyethylene pipe remains in a reduced state until the polyethylene pipe is run to a preselected depth. After the polyethylene pipe is run to the desired depth, the reduced pipe is allowed to rebound thereby forming a fluid tight seal with the casing and effectively sealing any breaches in the casing.

From the above description it is clear that the present invention is well adapted to carry out the objects and to attain the advantages mentioned herein as well as those inherent in the invention. While a presently preferred embodiment of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. A method for lining a casing affixed within a well bore, comprising the steps of:

providing a tubular polymeric material having an outer diameter greater than the inner diameter of the casing and an insertion end;

reducing the outer diameter of the tubular polymeric material so that the outer diameter of the tubular polymeric material is less than the inner diameter of the casing thereby enabling the tubular polymeric material to pass into the casing;

passing the reduced tubular polymeric material down the casing to a predetermined depth;

maintaining the reduced tubular polymeric material in tension by suspending an amount of weight from the insertion end of the tubular polymeric material prior to passing same down the casing sufficient to maintain the tubular polymeric material in tension as same is being passed down the casing so that the outer diameter of the tubular polymeric material remains less than the inner diameter of the casing as the tubular polymeric material is being passed down the casing; and allowing the reduced tubular polymeric material to rebound such that the exterior wall of the tubular polymeric material sealingly presses against the internal wall of the casing so as to seal a breach in the casing.

2. The method of claim 1 wherein the step of reducing the outer diameter of the tubular polymeric material comprises the step of:

passing the tubular polymeric material through a roller reduction unit comprising a plurality of banks of rollers wherein the banks of rollers cooperate to form a substantially frusto-conically shaped passageway such that the outer diameter of the tubular polymeric material is gradually reduced as the tubular polymeric material is passed therethrough.

3. The method of claim 2 wherein the step of reducing the outer diameter of the tubular polymeric material comprises the step of:

passing the tubular polymeric material through a roller reduction unit comprising a plurality of banks of rollers wherein the banks of rollers cooperate to form a substantially frusto-conically shaped passageway such that the outer diameter of the tubular polymeric material is gradually reduced as the tubular polymeric material is passed therethrough, each subsequent bank of rollers having a greater number of rollers than the previous bank of rollers to reduce trauma to the tubular polymeric material thereby increasing the time the tubular polymeric material remains in a reduced state.

4. The method of claim 1 wherein the step of suspending the amount of weight from the insertion end of the tubular polymeric material comprises the steps of:

disposing a weight retainer member in the tubular polymeric material adjacent the insertion end;

connecting a pulling head to the insertion end of the tubular polymeric material, the pulling head having an inner diameter less than the inner diameter of the tubular polymeric material such that an internal support shoulder is formed by the pulling head; and connecting the amount of weight to the weight retainer member so that weight retainer member engages the support shoulder of the pulling head and the amount of weight is supported on the support shoulder of the pulling head.

5. The method of claim 4 wherein the step of allowing the reduced tubular polymeric material to rebound comprises the step of removing the amount of weight from the pulling head.

6. The method of claim 5 wherein the weight retainer member is provided with a fishing neck, and wherein the step of removing the amount of weight from the pulling head comprises the steps of:

disposing a tubing string down the tubular polymeric material, the tubing string having an upper end connected to surface equipment and a lower end;

connecting the lower end of the tubing string to the fishing neck of the weight retainer member; and pulling the weight retainer member and the amount of weight up through the tubular polymeric material.

7. The method of claim 5 wherein the weight retainer member is provided with a fishing neck on an upper end and a plurality of cutting members on a lower rim portion, and wherein the step of removing the amount of weight from the pulling head comprises the steps of:

disposing a tubing string down the tubular polymeric material, the tubing string having an upper end connected to surface equipment and a lower end;

connecting the lower end of the tubing string to the fishing neck of the weight retainer member;

rotating the weight retainer member so as to cut away the support shoulder of the pulling head; and pulling the weight retainer member and the amount of weight up through the tubular polymeric material.

8. The method of claim 7 further comprising the step of:

retaining the cuttings produced from cutting the support shoulder of the pulling head in the weight retainer member.

9. A method for lining a casing affixed within a well bore, comprising the steps of:

providing a tubular polymeric material having an outer diameter greater than the inner diameter of the casing and an insertion end;

reducing the outer diameter of the tubular polymeric material so that the outer diameter of the tubular polymeric material is less than the inner diameter of the casing thereby enabling the tubular polymeric material to pass into the casing;

passing the reduced tubular polymeric material down the casing to a predetermined depth;

maintaining the reduced polymeric material in a reduced state until the reduced polymeric material is positioned at the predetermined depth by placing the reduced tubular polymeric material in tension as same is being passed down the casing, the reduced tubular polymeric material being placed in tension by suspending an amount of weight from the insertion of the tubular polymeric material prior to passing same down the casing sufficient to maintain the tubular polymeric material in tension as same is being passed down the casing so that the outer diameter of the tubular polymeric material remains less than the inner diameter of the casing as the tubular polymeric material is being passed down the casing; and allowing the reduced tubular polymeric material to rebound such that the exterior wall of the tubular polymeric material sealingly presses against the internal wall of the casing so as to seal a breach in the casing.

10. The method of claim 9 wherein the step of suspending the amount of weight from the insertion end of the tubular polymeric material comprises the steps of:

disposing a weight retainer member in the tubular polymeric material adjacent the insertion end;

connecting a pulling head to the insertion end of the tubular polymeric material, the pulling head having an inner diameter less than the inner diameter of the tubular polymeric material such that an internal support shoulder is formed by the pulling head; and connecting the amount of weight to the weight retainer member so that weight retainer member engages the support shoulder of the pulling head and the amount of weight is supported on the support shoulder of the pulling head.

11. The method of claim 10 wherein the step of allowing the reduced tubular polymeric material to rebound comprises the step of removing the amount of weight from the pulling head.

12. The method of claim 11 wherein the weight retainer member is provided with a fishing neck, and wherein the step of removing the amount of weight from the pulling head comprises the steps of:

disposing a tubing string down the tubular polymeric material, the tubing string having an upper end connected to surface equipment and a lower end;

connecting the lower end of the tubing string to the fishing neck of the weight retainer member; and pulling the weight retainer member and the amount of weight up through the tubular polymeric material.

13. The method of claim 11 wherein the weight retainer member is provided with a fishing neck on an upper end and a plurality of cutting members on a lower rim portion, and wherein the step of removing the amount of weight from the pulling head comprises the steps of:

disposing a tubing string down the tubular polymeric material, the tubing string having an upper end connected to surface equipment and a lower end;

connecting the lower end of the tubing string to the fishing neck of the weight retainer member;

rotating the weight retainer member so as to cut away the support shoulder of the pulling head; and pulling the weight retainer member and the amount of weight up through the tubular polymeric material.

14. The method of claim 13 further comprising the step of:

retaining the cuttings produced from cutting the support shoulder of the pulling head in the weight retainer member.

15. The method of claim 9 wherein the step of reducing the outer diameter of the tubular polymeric material comprises the step of:

passing the tubular polymeric material through a roller reduction unit comprising a plurality of banks of rollers wherein the banks of rollers cooperate to form a substantially frusto-conically shaped passageway such that the outer diameter of the tubular polymeric material is gradually reduced as the tubular polymeric material is passed therethrough.

16. The method of claim 15 wherein the step of reducing the outer diameter of the tubular polymeric material comprises the step of:

passing the tubular polymeric material through a roller reduction unit comprising a plurality of banks of rollers wherein the banks of rollers cooperate to form a substantially frusto-conically shaped passageway such that the outer diameter of the tubular polymeric material is gradually reduced as the tubular polymeric material is passed therethrough, each subsequent bank of rollers having a greater number of rollers than the previous bank of rollers to reduce trauma to the tubular polymeric material thereby increasing the time the tubular polymeric material remains in a reduced state.

17. A method for lining a casing affixed within a well bore, comprising the steps of:

providing a tubular polymeric material having an outer diameter greater than the inner diameter of the casing, the tubular polymeric material having an insertion end;

disposing a weight retainer member in the insertion end of the tubular polymeric material;

connecting a pulling head to the insertion end of the tubular polymeric material, the pulling head having an inner diameter less than the inner diameter of the tubular polymeric material such that an internal support shoulder is formed by the pulling head;

passing the pulling head and the tubular polymeric material through a roller reduction unit to reduce the outer diameter of the pulling head and the tubular polymeric material so that the outer diameter of the pulling head and the tubular polymeric material is less than the inner diameter of the casing thereby enabling the pulling head and the tubular polymeric material to pass into the casing;

connecting an amount of weight to the weight retainer member so that the weight member engages the support shoulder of the pulling head and the amount of weight is supported on the support shoulder of the pulling head, the amount of weight being sufficient to maintain the tubular polymeric material in tension as same is being passed down the casing so that the outer diameter of the tubular polymeric material remains less than the inner diameter of the casing as the tubular polymeric material is being passed down the casing;

passing the reduced tubular polymeric material down the casing to a predetermined depth; and removing the amount of weight from the pulling head so as to allow the reduced tubular polymeric material to rebound such that the exterior wall of the tubular polymeric material sealingly presses against the internal wall of the casing so as to seal a breach in the casing.

18. The method of claim 17 wherein the weight retainer member is provided with a fishing neck, and wherein the step of removing the amount of weight from the pulling head comprises the steps of:

disposing a tubing string down the tubular polymeric material, the tubing string having an upper end connected to surface equipment and a lower end;

connecting the lower end of the tubing string to the fishing neck of the weight retainer member; and pulling the weight retainer member and the amount of weight up through the tubular polymeric material.

19. The method of claim 17 wherein the weight retainer member is provided with a fishing neck on an upper end and a plurality of cutting members on a lower rim portion, and wherein the step of removing the amount of weight from the pulling head comprises the steps of:

disposing a tubing string down the tubular polymeric material, the tubing string having an upper end connected to surface equipment and a lower end;

connecting the lower end of the tubing string to the fishing neck of the weight retainer member;

rotating the weight retainer member so as to cut away the support shoulder of the weight retainer member; and pulling the weight retainer member and the amount of weight up through the tubular polymeric material.

20. The method of claim 19 further comprising the step of:

retaining the cuttings produced from cutting the support shoulder of the pulling head in the weight retainer member.

21. A method for lining a casing affixed within a well bore, comprising the steps of:

providing a viscoelastic pipe having an outer diameter greater than the inner diameter of the casing;

reducing the outer diameter of the pipe so that the outer diameter of the pipe is less than the inner diameter of the casing while passing the pipe into the casing to a predetermined depth and loading the pipe with an amount of weight so as to place the pipe in sufficient tension so that the outer diameter of the pipe remains less than the inner diameter of the casing as the pipe is being passed into the casing to the predetermined depth; and unloading the amount of weight from the pipe thereby allowing the pipe to expand against the internal wall of the casing.

22. The method of claim 21 wherein the step of maintaining the pipe in a reduced state further comprises the steps of:

disposing a weight retainer member in the pipe;

connecting a pulling head to one end of the pipe, the pulling head having an inner diameter less than the inner diameter of the pipe such that an internal support shoulder is formed by the pulling head; and connecting the amount of weight to the weight retainer member so that weight retainer member engages the support shoulder of the pulling head and the amount of weight is supported on the support shoulder of the pulling head.

23. The method of claim 22 wherein the weight retainer member is provided with a fishing neck, and wherein the step of unloading the amount of weight from the pulling head comprises the steps of:

disposing a tubing string down the pipe, the tubing string having an upper end connected to surface equipment and a lower end;

connecting the lower end of the tubing string to the fishing neck of the weight retainer member; and pulling the weight retainer member and the amount of weight up through the pipe.

24. The method of claim 22 wherein the weight retainer member is provided with a fishing neck on an upper end and a plurality of cutting members on a lower rim portion, and wherein the step of unloading the amount of weight from the pulling head comprises the steps of:

disposing a tubing string down the pipe, the tubing string having an upper end connected to surface equipment and a lower end;

connecting the lower end of the tubing string to the fishing neck of the weight retainer member;

rotating the weight retainer member so as to cut away the support shoulder of the pulling head; and pulling the weight retainer member and the amount of weight up through the pipe.

25. The method of claim 24 further comprising the step of:

retaining the cuttings produced from cutting the support shoulder of the pulling head in the weight retainer member.

26. The method of claim 21 wherein the step of reducing the outer diameter of the pipe comprises the step of:

passing the pipe through a roller reduction unit comprising a plurality of banks of rollers wherein the banks of rollers cooperate to form a substantially frusto-conically shaped passageway such that the outer diameter of the pipe is radially compressed as the pipe is passed therethrough.

27. The method of claim 21 wherein the step of reducing the outer diameter of the pipe comprises the step of:

passing the pipe through a roller reduction unit comprising a plurality of banks of rollers wherein the banks of rollers cooperate to form a substantially frusto-conically shaped passageway such that the outer diameter of the pipe is radially compressed as the pipe is passed therethrough, each subsequent bank of rollers having a greater number of rollers than the previous bank of rollers to reduce trauma to the pipe.

28. A method for lining a casing affixed within a well bore, comprising the steps of:

providing a viscoelastic pipe having an outer diameter greater than the inner diameter of the casing;

passing the viscoelastic pipe through a roller reduction unit at the well bore to radially compress the viscoelastic pipe so as to reduce the outer diameter of the viscoelastic pipe so that the outer diameter of the viscoelastic pipe is less than the inner diameter of the casing, the roller reduction unit having a plurality of banks of rollers cooperating to form a substantially frustro-conically shaped passageway such that the outer diameter of the viscoelastic pipe is gradually reduced as the viscoelastic pipe is passed therethrough;

passing the reduced viscoelastic pipe into the casing to a predetermined depth prior to the reduced viscoelastic pipe expanding against the internal wall of the casing; and allowing the viscoelastic pipe to expand against the internal wall of the casing thereby providing a fluid-tight casing liner.

29. The method of claim 28 wherein the step of passing the viscoelastic pipe through the roller reduction unit comprises the step of:

passing the pipe through the roller reduction unit wherein each subsequent bank of rollers have a greater number of rollers than the previous bank of rollers to reduce trauma to the pipe and thereby increase the reduction time of the viscoelastic pipe.

* * * * *